(12) United States Patent
Zhao et al.

(10) Patent No.: US 7,941,302 B2
(45) Date of Patent: May 10, 2011

(54) ENHANCED CHANNEL SIMULATOR FOR EFFICIENT ANTENNA EVALUATION

(75) Inventors: Xueyuan Zhao, Hong Kong (HK);
Chun Kit Lee, Hong Kong (HK);
Zhengang Pan, Hong Kong (HK);
Chih-Lin I, Hong Kong (HK); Kin Nang Lau, Hong Kong (HK); Roger Shu Kwan Cheng, Hong Kong (HK)

(73) Assignee: Hong Kong Applied Science and Technology Research Institute Co. Ltd., Hong Kong (HK)

( * ) Notice: Subject to any disclaimer, the term of this patent is extended or adjusted under 35 U.S.C. 154(b) by 384 days.

(21) Appl. No.: 12/129,896

(22) Filed: May 30, 2008

(65) Prior Publication Data

US 2009/0299717 A1 Dec. 3, 2009

(51) Int. Cl.
*G06F 17/50* (2006.01)
*H04L 27/00* (2006.01)

(52) U.S. Cl. ............... 703/2; 703/5; 703/17; 455/226.1; 342/457; 375/299

(58) Field of Classification Search .................. 703/2, 5, 703/17; 455/226.1; 345/450; 342/457; 375/299
See application file for complete search history.

(56) References Cited

U.S. PATENT DOCUMENTS

| | | | |
|---|---|---|---|
| 3,824,500 A * | 7/1974 | Rothenberg | .................. 333/136 |
| 5,548,809 A * | 8/1996 | Lemson | ........................ 455/454 |
| 5,655,217 A * | 8/1997 | Lemson | ........................ 455/513 |
| 6,236,363 B1 | 5/2001 | Robbins et al. | |
| 7,054,781 B2 | 5/2006 | Kolu et al. | |
| 7,154,959 B2 | 12/2006 | Erceg et al. | |
| 7,525,484 B2 * | 4/2009 | Dupray et al. | ................ 342/450 |
| 7,764,231 B1 * | 7/2010 | Karr et al. | ...................... 342/457 |
| 2003/0103011 A1 | 6/2003 | Rogers et al. | |
| 2003/0222820 A1 * | 12/2003 | Karr et al. | ...................... 342/457 |
| 2004/0088628 A1 | 5/2004 | Poutanen et al. | |
| 2006/0148429 A1 | 7/2006 | Inogai et al. | |
| 2006/0194553 A1 * | 8/2006 | Ozaki et al. | ................ 455/226.1 |
| 2007/0019769 A1 | 1/2007 | Green et al. | |
| 2008/0129615 A1 * | 6/2008 | Breit et al. | ...................... 343/703 |
| 2008/0165891 A1 * | 7/2008 | Budianu et al. | ................ 375/299 |

OTHER PUBLICATIONS

M. Steinbauer, A. F. Molisch, and E. Bonek, "The Double-Directional Radio Channel", IEEE Magazine in Antennas and Propagation, vol. 43, No. 4, pp. 51-63, Aug. 2001, 13 pages.

* cited by examiner

*Primary Examiner* — Thai Phan
(74) *Attorney, Agent, or Firm* — Ella Cheong Hong Kong; Margaret Burke; Sam Yip

(57) ABSTRACT

Method and apparatus for channel simulation is disclosed. The claimed invention provides method and apparatus 1200 to simulate a propagation channel, particularly a multiple-input-multiple-input (MIMO) channel. The claimed invention further provides a method and apparatus for efficient optimization of antenna by the enhanced channel simulation. The claimed invention takes both antenna characteristics and channel characteristics as inputs, and output time-varying channel realizations to generate the system metrics as the optimization target for antenna under optimization. The claimed invention advantageous provides enhanced channel simulation to meet the accuracy requirement of antenna evaluation.

11 Claims, 14 Drawing Sheets

Channel simulator 600

ENHANCED CHANNEL SIMULATOR FOR EFFICIENT ANTENNA EVALUATION

RELATED APPLICATION

There are no related applications.

TECHNICAL FIELD

The claimed invention relates generally to a channel simulation method and apparatus, more particularly to a MIMO (Multiple-Input and Multiple-Output) channel simulation and a MIMO channel simulator. The claimed invention further relates to an antenna evaluation and optimization method, more particularly to a method of improving antenna designs by MIMO channel simulation.

BACKGROUND OF THE INVENTION

For antenna design and evaluation according to existing and established methods, four groups of people are generally involved. The first group is the antenna designers, who design antenna module based on the application, carrier frequency, antenna gain and other various requirements. For terminal MIMO antenna design, the characteristics such as antenna radiation pattern and antenna element isolation are the key parameters. The fabricated antenna module is evaluated by another group called the measurement group, who performs a series of field tests so that an antenna is tested in real channel environments. The antenna designers, based on the feedback from the measurement group, improve their designs so that the field test results meet the requirements.

The designed antenna module is delivered to the hardware system design group, who designs specific wireless hardware systems for the given application. For hardware system design, the characteristics such as capacity, BER (bit-error rate), and FER (frame-error rate) are the target metrics to optimize. The final wireless hardware system with antenna mounted is traditionally measured and tested in real radio environments by the measurement group. Specific measurement platform is required to perform the measurement on a series of measurement sites. The choices of the sites should cover the target channel environments of the wireless hardware system. On each site, the wireless hardware system is tested with different configurations and the antenna module is tested with different orientations. And the results will be feedback to the system designers as well as the antenna designers to improve wireless system designs and antenna designs.

The fourth group is CAD (Computer Aided Design) tool designers. To enable a fast design cycle, CAD tools, especially certain antenna electromagnetic (EM) simulators, are generally used in the antenna design. The EM simulators generate the antenna characteristics based on antenna structure and antenna materials. The antenna characteristics generated include antenna radiation pattern, antenna transmission characteristics or reflection characteristics such as MIMO antenna element isolation, antenna gain, insertion loss, return loss, and VSWR (voltage standing wave ratio). The antenna designers use the EM simulators to find suitable antenna physical dimensions and antenna materials to achieve satisfactory antenna characteristics.

SUMMARY OF THE INVENTION

The claimed invention is on an enhanced channel simulator for antenna evaluation which provides the antenna virtual measurement capability in a simulation environment.

The aforesaid antenna design and evaluation process is advantageous in that the antenna is tested in real channel environments with all possible effects in reality reflected in the results.

However, field measurements generally take long time. The measurement is not repeatable even on the same site because of environment variables. The measurement platform uses a hardware antenna module, so it is not possible to change the antenna parameters on site. Thus if better performance is desired, the antenna needs to be re-designed, fabricated and mounted on the measurement platform before testing continues. The antenna may still have great potential of optimization which may not be completed due to time constraints.

The cost of the field measurement is demanding. Apart from slow evaluation speed and associated costs, antenna performance evaluation is directly limited by the accessibility of the desired testing locations. Iterative cycles can result further compounding time to market as well as underlying design costs.

The major drawbacks of the current antenna design and evaluation process can be summarized as time-consuming, non-repeatable, lack of flexibility and high cost.

Consequently, it is desired to have an antenna evaluation method which is efficient, repeatable, flexible and low cost. More critically, new methods should be able to use the actual 3D antenna radiation pattern, generate the time-varying channel realization sequence, and simulate the real radio channel precisely. Thus a preferred embodiment of the new antenna evaluation method is an MIMO channel simulation method. The MIMO channel simulation method ideally uses channel data obtained from either measurement or from channel probing and importing antenna radiation pattern and antenna element isolation, to robustly and accurately simulate the radio channel. Results should be consistent compared with the measurement results.

Given these requirements and constraints, an enhanced MIMO channel simulator is hereby disclosed and claimed. The MIMO channel simulator and its associated methods have clear distinction with the known methods. The previous approaches include the channel modeling methods for baseband simulation, for antenna evaluation and for network planning.

Baseband MIMO channel simulation approaches can be categorized into correlation based channel modeling and double-directional channel modeling. With respect to correlation based channel modeling, signal correlation at the transmitter and receiver are characterized as correlation matrices with a simple antenna radiation pattern assumed for the computation of the correlation. Double-directional channel modeling extracts all channel effects and models them as scatterers. The radiation pattern is idealistic, and the rays propagating through the scatterer have simple assumptions. For double-directional channel modeling, a distinct pair of transmitting and receiving cluster is assumed. These baseband modeling methods generally have simple channel assumptions, thus these method may not be accurately enough to match with the practical measurement results. These baseband modeling methods can be implemented in the channel emulators for hardware system designers to test their wireless hardware systems.

On antenna evaluation, previous known approaches are only limited to utilizing antenna radiation pattern and receiving signal power distribution, and computing antenna correlation, and received power or effective gain. Previous approaches do not generate time-varying channel coefficients and they only use the channel power distribution on receiving side without actually modeling the channel characteristics between transmitter and receiver. Thus these methods are inadequate for channel simulation which characterizes the propagating channel characteristics.

On network planning, ray-tracing channel modeling has been used. But such modeling often requires very detailed real world floor layout information. Without the ability to rely on robust predictive modeling, ray-tracing channel modeling cannot be equally scaled to other implementations.

For the claimed simulation method, it differs from previous methods in the following aspects: Compared with baseband channel simulation methods, the disclosed method utilizes actual 3D antenna radiation pattern measured in chamber, and has an enhancement on modeling the properties of clusters which improves its performance in predicting the field measurement results. Additionally, the simulated results can be consistent with the field measurement results. Compared with the antenna evaluation methods using antenna radiation pattern, the claimed method models the physical channel more precisely—including transmitting signal distribution, receiving signal distribution and the relationship of transmitting and receiving clusters. Consequently, the time-varying channel realization sequence is generated to the compute system metrics. The system metrics is finally used to optimize the antenna's parameters. Compared with the networking planning methods, the claimed method does not require the detailed real world floor layout information. The time-varying channel realization sequence is the output other than the received signal power in most network planning situations.

In contrast to the available channel modeling methods, the claimed invention provides an enhanced MIMO channel simulation method. The enhanced MIMO channel simulation method simulates the propagation channel between any transmitters and any receivers based upon a more robust and predictive model. As a result, the enhanced channel simulation provides a virtual measurement platform to evaluate the antenna so that the effort of field tests can be reduced. This saves time and makes the evaluation of antenna design parameters more flexible. At the same time, the enhanced MIMO channel simulation still provides accurate evaluation results that are comparable to the field measurements.

The claimed channel simulation method includes obtaining channel power angular distribution, generating time-varying channel realization sequence, adding antenna element isolation effect and generating system metrics. The channel power angular distribution can be generated from the pre-defined channel scenario, or estimated for channel probing. In generating the time-varying channel realization sequence, the claimed simulation method is enhanced by proposing a cluster mapping matrix defining the power mapping relationship of the transmitting-receiving cluster pairs, which is a more accurate modeling of channel characteristics. The generated channel realization sequence is used to generate the system metrics as capacity, BER and FER indicator.

The channel simulation method is further packaged into a channel simulator with specific inputs and outputs. The inputs of the simulator include the antenna radiation pattern data, antenna element isolation data, and other antenna characteristics if needed. The antenna radiation pattern can be obtained from antenna testing or electromagnetic simulation, and the antenna element isolation can be obtained from the network analyzer measurement. The outputs of the simulator include the time-varying channel realization sequence and the generated system metrics.

The claimed invention also provides a method of antenna evaluation and optimization by using the said enhanced MIMO channel simulator. The system metrics such as capacity, BER and FER indicator, are used for antenna optimization. The optimization process in one aspect of the claimed invention is thus different from the traditional ones which aim at optimizing antenna metrics. The optimization process provided in the claimed invention optimizes the system performance directly. A possible way of optimize the antenna design parameter is to define system metrics as the fitness function in the genetic algorithm optimization process of the antenna parameters. The resulting provides a handy antenna evaluation tool for antenna design under given set of channel scenarios.

Other aspects of the claimed invention are also disclosed.

BRIEF DESCRIPTION OF THE DRAWINGS

These and other objects, aspects and embodiments of this invention will be described hereinafter in more details with reference to the following drawings, in which.

DETAILED DESCRIPTION OF THE DRAWINGS

Figure 1:
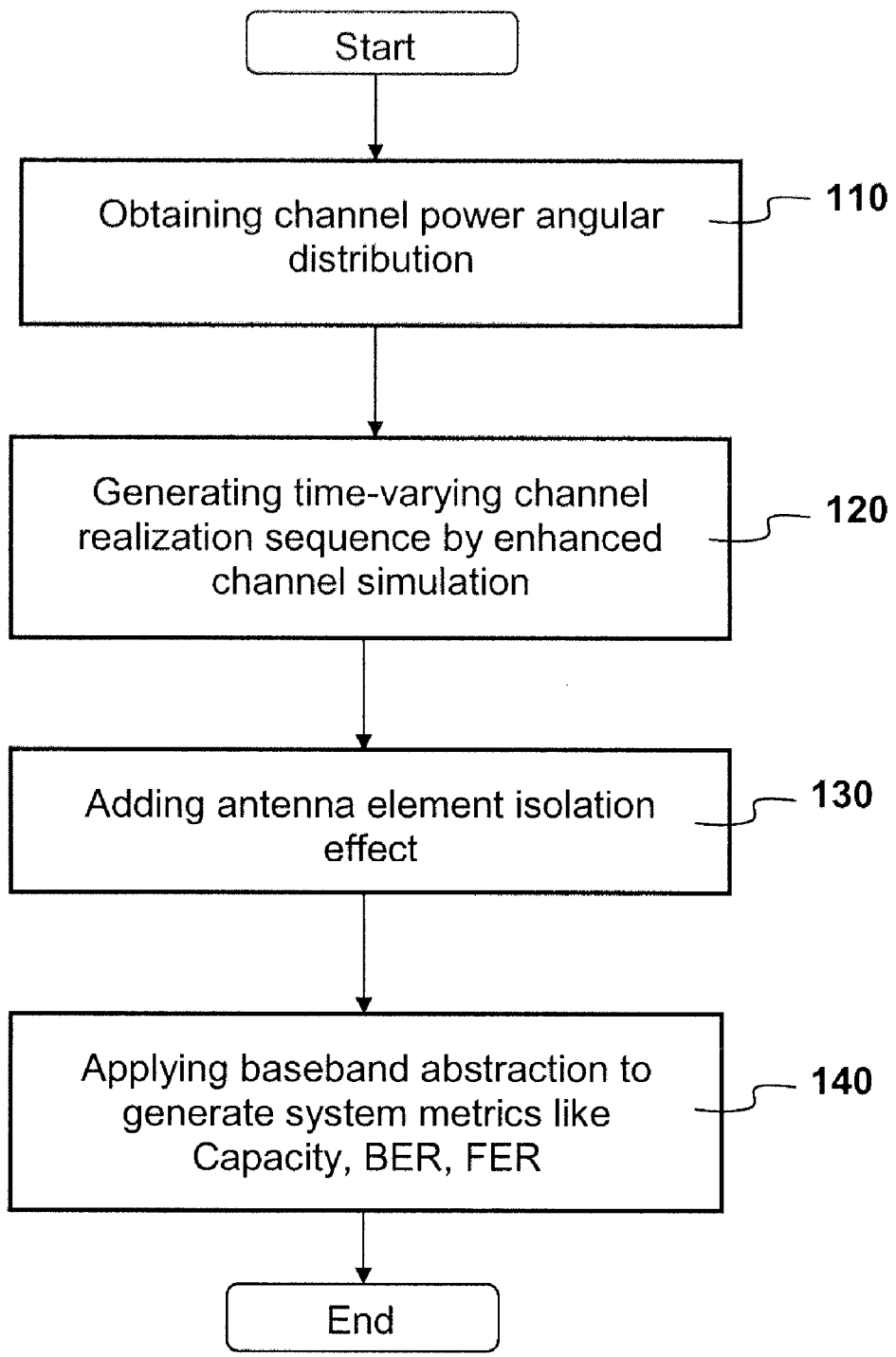
FIG. 1 shows a flowchart illustrating a method of simulating a propagation channel.

FIG. 1 shows a flowchart illustrating a method of simulating a propagation channel. Firstly, a channel power angular distribution is obtained in channel characteristic obtaining step 110. Secondly, time-varying channel realization sequence is generated in channel realization step 120. The output of this channel realization step 120 is time-varying channel realization sequence (not shown). The channel realization sequence is sampled at certain time intervals. Each element in the channel realization sequence is a matrix of complex channel responses of all transmitting and receiving antenna combinations, and sampled at specific time instances. Thirdly, antenna isolation effect is applied to the time-varying channel realization sequence generated in antenna element isolation effect step 130. Fourthly, baseband abstraction is applied to generate system metrics such as capacity, BER and FER indicator, in system metric output step 140.

Mainly two categories of information are needed by channel simulation. The first category is channel characteristics which in particular are power angular distributions as acquired in the obtaining step 110, and the other category is antenna characteristics which include antenna radiation pattern and antenna element isolation. The antenna radiation pattern is to be input in the channel realization step 120. The antenna element isolation is to be input in the antenna element isolation effect step 130.

Generally there are two ways to obtain the channel characteristics. One way is by generation as shown in FIG. 2A and the other way is by estimation as illustrated in FIG. 2B.

Antenna characteristics are generally provided by either measuring the real antenna module using chamber and network analyzer, or by performing electromagnetic simulation of the antenna design. For terminal MIMO antenna module, the major antenna characteristics are the antenna radiation pattern, and the antenna element isolation of the MIMO antenna.

Figure 2A:
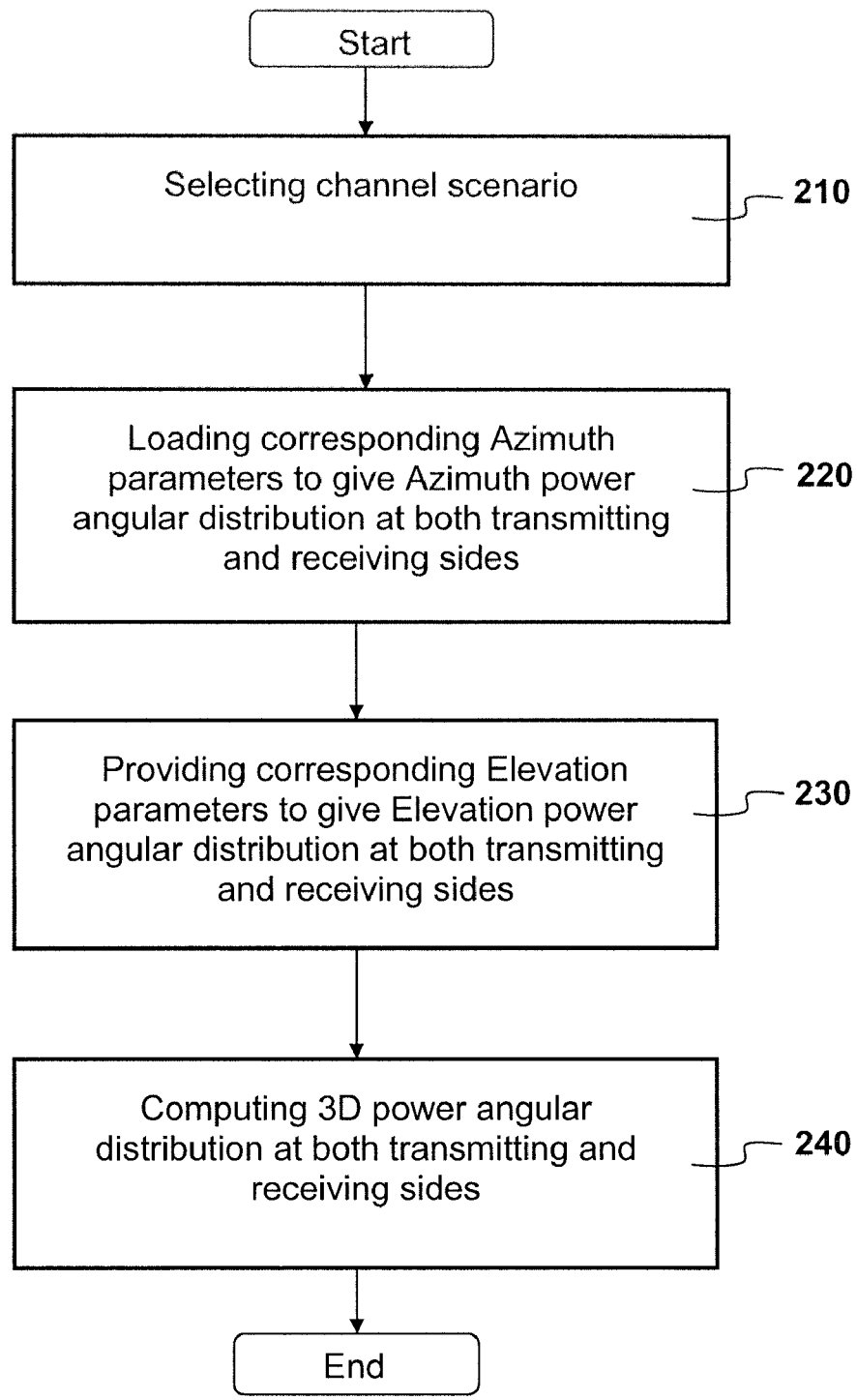
FIG. 2A shows a flowchart illustrating one of the possible embodiments of how a channel power angular distribution is obtained by generation.
Figure 2B:
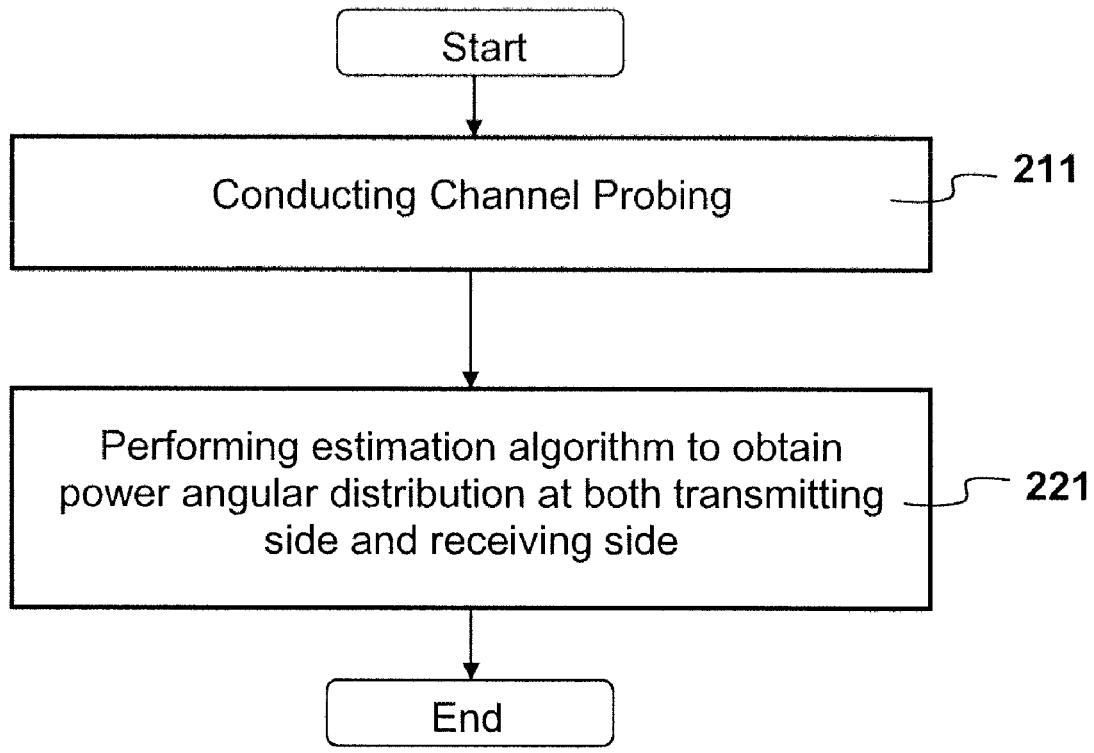
FIG. 2B shows a flowchart illustrating one of the possible embodiments of how a channel power angular distribution is obtained by estimation.

FIG. 2A shows a flowchart illustrating one of the possible embodiments of how channel power angular distribution is obtained by generation. Generation step uses a set of channel key parameters predefined according to known standardized channel modeling information. This set of channel key parameters is called channel scenarios collectively. Firstly, the channel scenario to be loaded is selected in selecting step 210. The channel scenarios can include a variety of scenarios like office scenarios, open space scenarios, and outdoor scenarios.

Secondly, Azimuth parameters of the selected channel scenario are loaded in loading step 220. The Azimuth distributions of indoor and open space in one embodiment are Laplacian distributions, and for outdoor scenarios are Gaussian distributions in another embodiment. The Azimuth parameters include: 1) Number of ray clusters at both transmitting and receiving sides; 2) Angle Spread (AS) at transmitting side and the mean Angle of Departure (AoD) for each cluster; 3) AS at receiving side and the mean Angle of Arrival (AoA) for each cluster; and 4) Power Delay Profile (PDP) for each cluster. The Azimuth Power Angular Distribution (Azimuth PAD) can then be generated from the Azimuth parameters of the selected channel scenario for both transmitting and receiving sides.

Thirdly, Elevation parameters of the selected channel scenario are input in a providing step 230. The Elevation distributions of all scenarios in one embodiment are double-exponential distributions. The Elevation parameters include: peak angle of double-exponential distributions, standard deviation of exponential distribution above the peak angle, and standard deviation of exponential distribution under the peak angle. The Elevation Power Angular Distribution (Elevation PAD) is subsequently generated using the Elevation parameters of the selected channel scenario for both transmitting and receiving sides.

Finally, the 3D Power Angular Distribution (3D PAD) is computed in a computing step 240 using the Azimuth PAD and the Elevation PAD for at both transmitting and receiving sides. The Azimuth PAD and the Elevation PAD are independent in a preferred embodiment.

FIG. 2B shows a flowchart illustrating one of the possible embodiments of how channel power angular distribution is obtained by estimation. Channel power angular distributions of real radio environments are estimated using the channel probing data. Firstly, channel probing experiments are performed in a channel probing step 211. The channel probing experiments are separate experiments from channel measurement experiments.

The purpose of channel probing experiments is to find the channel power distribution of the receiving side and transmitting side in the channel measurements. In channel probing, different antennas other than the aforesaid antenna modules for channel measurement experiments are used. These antennas are specific-purpose antennas for channel probing only.

Two types of antennas are often used in one embodiment: omni-directional antennas, and directional antennas. To probe the receiving side, the omni-directional antenna is put at transmitting side, and the directional antenna is put at receiving side. The highly directional antenna is then rotated for N directions, and the received power values of the directional antenna at the receiving side are recorded.

To probe the transmitting side, the omni-directional antenna is put at the receiving side, and the directional antenna is put at transmitting side. And the highly directional antenna is rotated for N directions, and the received power values of the directional antenna at the transmitting side are recorded.

Secondly, the estimation algorithm is performed to obtain power angular distribution at both transmitting side and receiving side in estimation step 221. The general computation of the estimation algorithm is shown as follows, which is to be applied to the received power values at the transmitting side as well as the received power values at the receiving side respectively:

The received signal power has N values, and each value is the result of rotation angle $2\pi/N$. In general, the received signal power for either the transmitting side or the receiving side is $$R = \oint_0^p \oint_{-p}^p \{G_v(q,f)P_v(q,f) + G_h(q,f)P_h(q,f)\} \sin q \times dq \times df$$

where $G_v(q,f)$ is the vertical polarized component of the antenna radiation pattern gain at angle $(q,f)$, and $G_h(q,f)$ is the horizontal polarized component. $P_v(q,f)$ is the vertical polarized component of the channel power at angle $(q,f)$, and $P_h(q,f)$ is the horizontal polarized component. For 2D summation approximation, it becomes $$R = \sum_{n=1}^{N} \{G_{v,n}P_{v,n} + G_{h,n}P_{h,n}\}$$

Given $P_{v,n}=P_{h,n}=P_n$, $G_{v,n}+G_{h,n}=G_n$, and considering the rotation measurement experiment setup, the channel gains are shifted in one embodiment by one element compared with the previous measurement, the following N linear equations are generated:

$$\begin{bmatrix} R_1 \\ R_2 \\ \vdots \\ R_N \end{bmatrix} = \begin{bmatrix} G_1 & G_2 & \ldots & G_N \\ G_N & G_1 & \ldots & G_{N-1} \\ \ldots & & & \\ G_2 & G_3 & \ldots & G_1 \end{bmatrix} \begin{bmatrix} P_1 \\ P_2 \\ \vdots \\ P_N \end{bmatrix}$$

$R_1$ to $R_N$ are measured by channel probing, and $G_1$ to $G_N$ can also be measured in chamber. To estimate $P_1$ to $P_N$, LS (least-square) solution can be applied as:

$$P = (G^H G)^{-1} G^H R$$

where P is an N×1 matrix representing the power angular distribution, G is an N×N matrix representing the antenna gain and R is an N×1 matrix representing the received signal power.

The above general computation is also applicable for 3D channel parameter estimation. For wideband system, the above general computation should be solved for each channel tap.

Figure 3A:
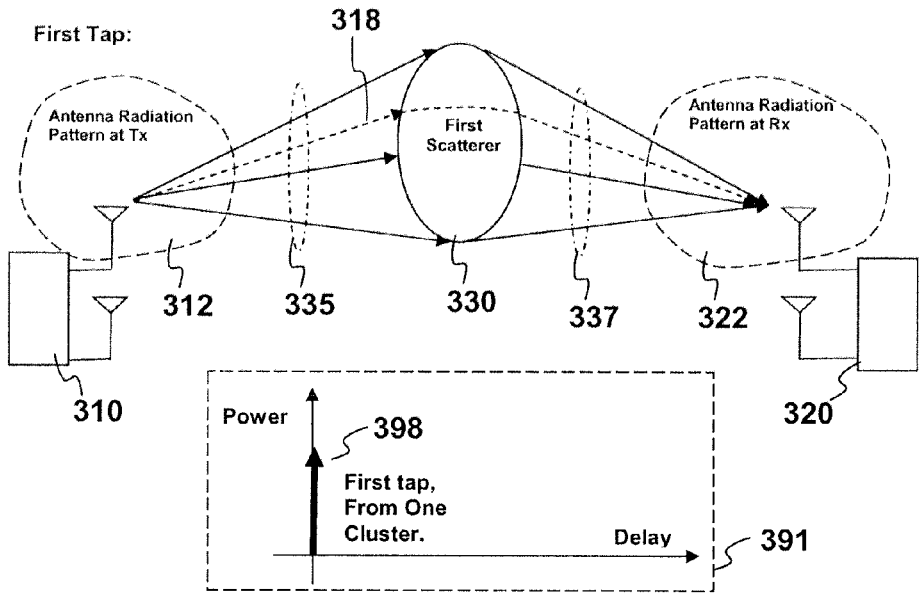
FIG. 3A shows an exemplary scenario of a two-tap channel illustrating a first tap.
Figure 3B:
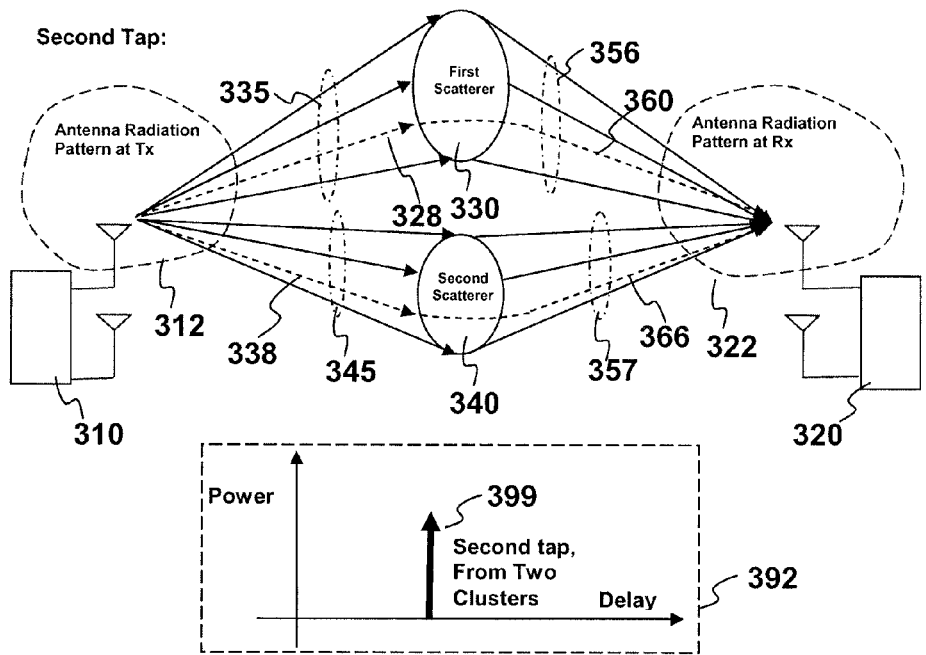
FIG. 3B shows an exemplary scenario of a two-tap channel illustrating a second tap.

As an embodiment of the claimed invention, MIMO channel simulation is adopted. The principle of the MIMO channel simulation is illustrated in FIG. 3A and FIG. 3B. A preferred embodiment of the MIMO channel simulation is double-directional channel modeling. The double-directional channel modeling basically extracts all channel effects and models them as scatterers. Scatterers are the abstraction of channel effects representing scattering, reflection, diffraction and line-of-sight propagation. Each scatterer can change propagating ray's amplitude, phase and polarization.

FIG. 3A and FIG. 3B describe taps of the same channel with different delay. FIG. 3A shows an exemplary scenario of a two-tap channel illustrating the first tap. Transmitter 310 has mounted antenna with radiation pattern 312. Receiver 320 has mounted antenna with radiation pattern 322. A number of individual rays 318 from the transmitter 310 to the receiver 320 through a first scatterer 330 constitute rays arriving at the receiver 320 at the same time instance (the first tap). At the transmitting side before the first scatterer 330, multiple rays are distributed from the transmitter 310, constituting a first transmitting cluster 335. At the receiving side after passing through the first scatterer 330, multiple rays arriving at the receiver 320 with the same delay, constituting a first receiving cluster 337. In a first power-delay profile 391, the first tap 398 refers to rays from the first receiving cluster 337.

FIG. 3B shows an exemplary scenario of a two-tap channel illustrating the second tap. Transmitter 310 has mounted antenna with radiation pattern 312. Receiver 320 has mounted antenna with radiation pattern 322. Rays arriving at the receiver 320 at the second tap's time instance are from two distinct scatterers including the first scatterer 330 and a second scatterer 340. At the transmitting side, there are a second transmitting cluster 335 and a third transmitting cluster 345. At the receiving side, there are a second receiving cluster 356 and a third receiving cluster 357. In this model, rays that propagate from the second transmitting cluster 335, for example ray 328, can only be mapped to rays of the second receiving cluster 356, for example ray 360. Similarly, rays from the third transmitting cluster 345 such as ray 338 can only be mapped to rays in the corresponding cluster at the receiving side, that is the third receiving cluster 357, for example ray 366. In a second power-delay profile 392, the second tap 399 refers to rays from the second receiving cluster 356 and the third receiving cluster 357.

In general, a double-directional channel may have n taps which constitute to rays with n possible delay time. For each tap, with a wireless system setup of P transmitting antennas and Q receiving antennas, the channel realization between the p-th transmitting antenna and q-th receiving antenna for one tap is computed as:

$$H_{p,q}(t) = \sqrt{\frac{1}{M_0}} \sum_{m=1}^{M_0} \left\{ \begin{bmatrix} R_{T,p}^{(v)}(m) \cdot \Omega_{T,p}(m,t) \\ R_{T,p}^{(h)}(m) \cdot \Omega_{T,p}(m,t) \end{bmatrix}^T \cdot \\ P_{SM} \cdot \begin{bmatrix} \Omega_{R,p}(m,t) \cdot R_{R,q}^{(v)}(m) \\ \Omega_{R,p}(m,t) \cdot R_{R,q}^{(h)}(m) \end{bmatrix} \right\}$$

where $M_0$ is the number of rays with the assumption that each ray has equal power, thus the ray density represents the power angular distribution. The angle for each ray is $(\theta_m, \phi_m)$;

$R_{T,p}^{(v)}(m)$ is the antenna complex response for vertical polarized component of the p-th transmitting antenna at the direction of $(\theta_m, \phi_m)$;

$R_{R,q}^{(v)}(m)$ is the antenna complex response for vertical polarized component of the q-th receiving antenna at the direction of $(\theta_m, \phi_m)$;

$R_{T,p}^{(h)}(m)$ is the antenna complex response for horizontal polarized component of the p-th transmitting antenna at the direction of $(\theta_m, \phi_m)$;

$R_{R,q}^{(h)}(m)$ is the antenna complex response for horizontal polarized component of the q-th receiving antenna at the direction of $(\theta_m, \phi_m)$;

$\Omega_{T,p}(m,t)$ is the phase shift at transmitting side for the ray at the direction of $(\theta_m, \phi_m)$, which is $\Omega_{T,p}(m,t) = \exp(j\alpha_{m,T,p}) \cdot \exp(j\beta_{m,T}(t))$, where $\alpha_{m,T,p}$ is the phase shift contributed by antenna structure, and $\beta_{m,T}(t)$ is the phase shift contributed by Doppler. For linear array in one embodiment, the two values are computed as $$\alpha_{m,T,p} = \frac{2\pi p D_{max}}{\lambda(P-1)} \sin\phi_m \sin\theta_m,$$

where $D_{max}$ is the distance of the two antenna elements at both ends, and $\lambda$ is the wavelength; and $$\beta_{m,T}(t) = \frac{2\pi}{\lambda} \cdot v \cdot t \cdot \cos(\phi_v - \phi_m)\sin\theta_m,$$

where v is the moving speed and $\phi_v$ is the moving direction with the assumption of moving in Azimuth plane, t is the time instance of the current channel realization.

$\Omega_{R,q}(m,t)$ is the phase shift at receiving side for each ray, and is defined as $\Omega_{R,q}(m,t) = \exp(j\alpha_{m,R,q}) \cdot \exp(j\beta_{m,R}(t))$ representing the phase shift values for the receiving ray of the q-th receiving antenna can be obtained similarly as the transmitting side.

$P_{SM}$ is the polarization scattering matrix which describes the polarization shift of each ray. It is defined as $$P_{SM} = \begin{bmatrix} \sqrt{1-\eta} \cdot e^{j\psi_m^{(v,v)}} & \sqrt{\eta} \cdot e^{j\psi_m^{(v,h)}} \\ \sqrt{\eta} \cdot e^{j\psi_m^{(h,v)}} & \sqrt{1-\eta} \cdot e^{j\psi_m^{(h,h)}} \end{bmatrix},$$

where $\eta$ is the portion of power that the polarization is converted, and $\psi_m^{(x,y)}$ represents the phase shifts of each ray from x polarization to y polarization. Random phases can be applied on these values.

The resulting channel realization needs to be scaled by the square root of the current tap power. LOS component may need to be added to the first tap, and log-normal fading and path loss need to be added.

Channel simulation is performed on a plurality of channel taps, and a plurality of antenna pairs, and a series of time instances. Therefore, the generated channel realization sequence has the dimension of time instances, delay taps and antenna pairs.

Figure 4A:
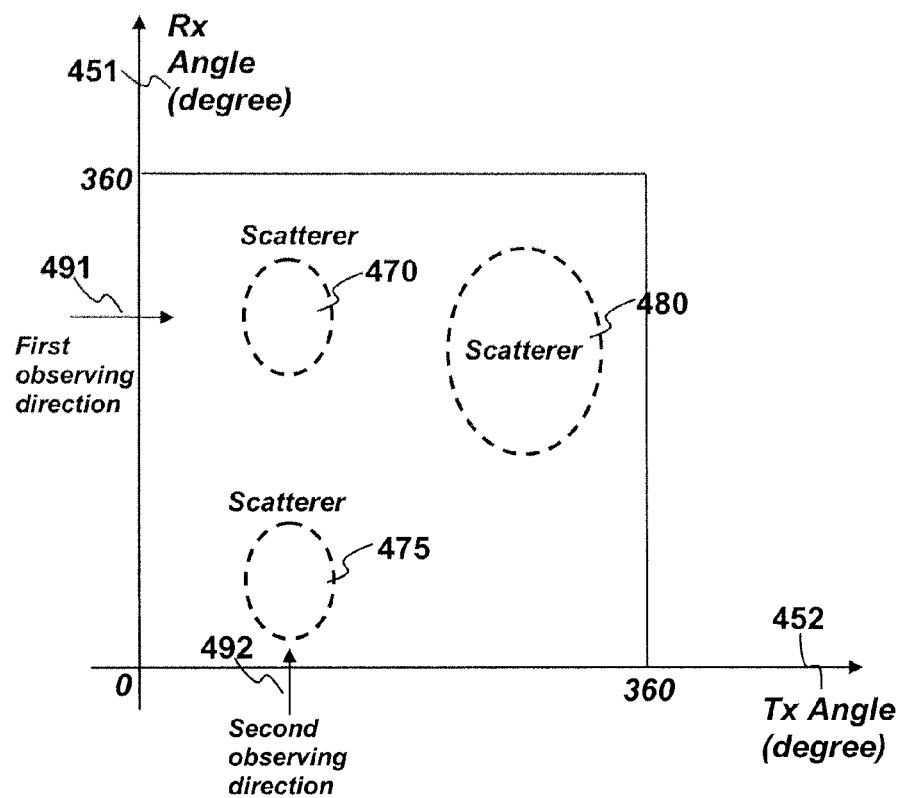
FIG. 4A shows an exemplary complete diagram of signal distribution between transmitter and receiver.
Figure 4B:
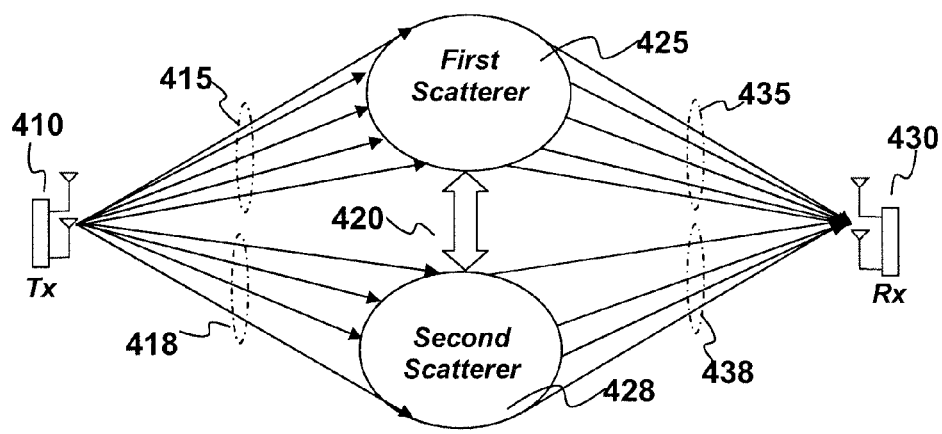
FIG. 4B shows an illustration of mapping a transmitting ray of a scatterer to a receiving ray of another scatterer.

In an embodiment of the claimed invention, channel simulation is enhanced by cluster mapping as shown in FIG. 4A and FIG. 4B. Cluster mapping is introduced to provide more accurate modeling of channel propagation environments. With cluster mapping between different scatterers introduced, a transmitting ray of a first scatterer, may have certain opportunities to be mapped to a receiving ray of a second scatterer. Therefore, performance relationship among a set of antenna modules can be observed by the enhanced channel simulation in this embodiment of the claimed invention.

FIG. 4A shows an exemplary complete diagram of signal angular distribution between transmitter and receiver. It is plotted as if viewing signals from any receiving angle 451 to any transmitting angle 452. Three scatterers including a first scatterer 470, a second scatterer 475 and a third scatterer 480 are observed. From a first observing direction 491, receiving rays come from the first scatterer 470 and the third scatterer 480 constituting a first receiving cluster (not shown). For receiving rays observed in this first receiving cluster, they are under the effects contributed from a combination of two scatterers 470, 480. From a second observing direction 492, transmitting rays pass through the second scatterer 475 and the first scatterer 470 constituting a second transmitting cluster (not shown). For the transmitting rays observed in this second transmitting cluster, they are under the effects contributed from another combination of two scatterers 470, 475.

One example of cluster mapping is to map the transmitting rays observed in the second observing direction 492 to the receiving rays observed in the first observing direction 491 despite of different combinations of contributory scatterers. FIG. 4B further shows an illustration of mapping a transmitting ray of one scatterer to a receiving ray of another scatterer. In general, power mapping relationship between any transmitting clusters and any receiving clusters, such as the power mapping relationship 420 between the transmitting clusters 415, 418 and the receiving clusters 435, 438, can be defined as a cluster mapping matrix:

$$\begin{bmatrix} a_{11} & a_{121} & \cdots & a_{1N} \\ a_{21} & a_{22} & \cdots & a_{2N} \\ \cdots & & & \\ a_{M1} & a_{M2} & & a_{MN} \end{bmatrix}$$

for M receiving clusters and N transmitting clusters where the notation $a_{mn}$ represents the power from $m^{th}$ receiving cluster to $n^{th}$ transmitting cluster. The incorporation of the cluster mapping matrix can simulate the reality closely.

The introduction of cluster mapping matrix is necessary for keeping simulation results for antenna performance consistent with measurement results by taking channel characteristics into considerations. While for baseband simulation, which is not used for evaluating antenna performance, the incorporation of cluster mapping matrix may not be required.

To obtain the element values $a_{mn}$ in the cluster mapping matrix, the following steps illustrate one of the possible embodiments: The first step is to perform channel probing to obtain the receiving power angular distribution and transmitting power angular distribution. From the transmitting and receiving power angular distributions, it is possible to identify a number of receiving clusters and transmitting clusters existing in the propagation channel, and also the range covered by each cluster. The second step is to perform another measurement to identify the power mapping relationship between each receiving-transmitting cluster pairs. A directional antenna is used at transmitting side so that the directional antenna points in a direction to the center of the first transmitting cluster. The half-power beamwidth and first-null beamwidth of the directional antenna are chosen to cover the range of the first transmitting cluster only. Channel probing is performed on the receiving side to obtain the corresponding receiving power angular distribution. Different power levels can be observed for different receiving clusters. Based on the power ratio of different receiving clusters, the values of the first column in the cluster mapping matrix, $a_{11}, a_{12}, a_{13} \ldots a_{M1}$, can be obtained. Similar operations can be carried out to obtain other values in the remaining columns in the cluster mapping matrix.

Figure 5:
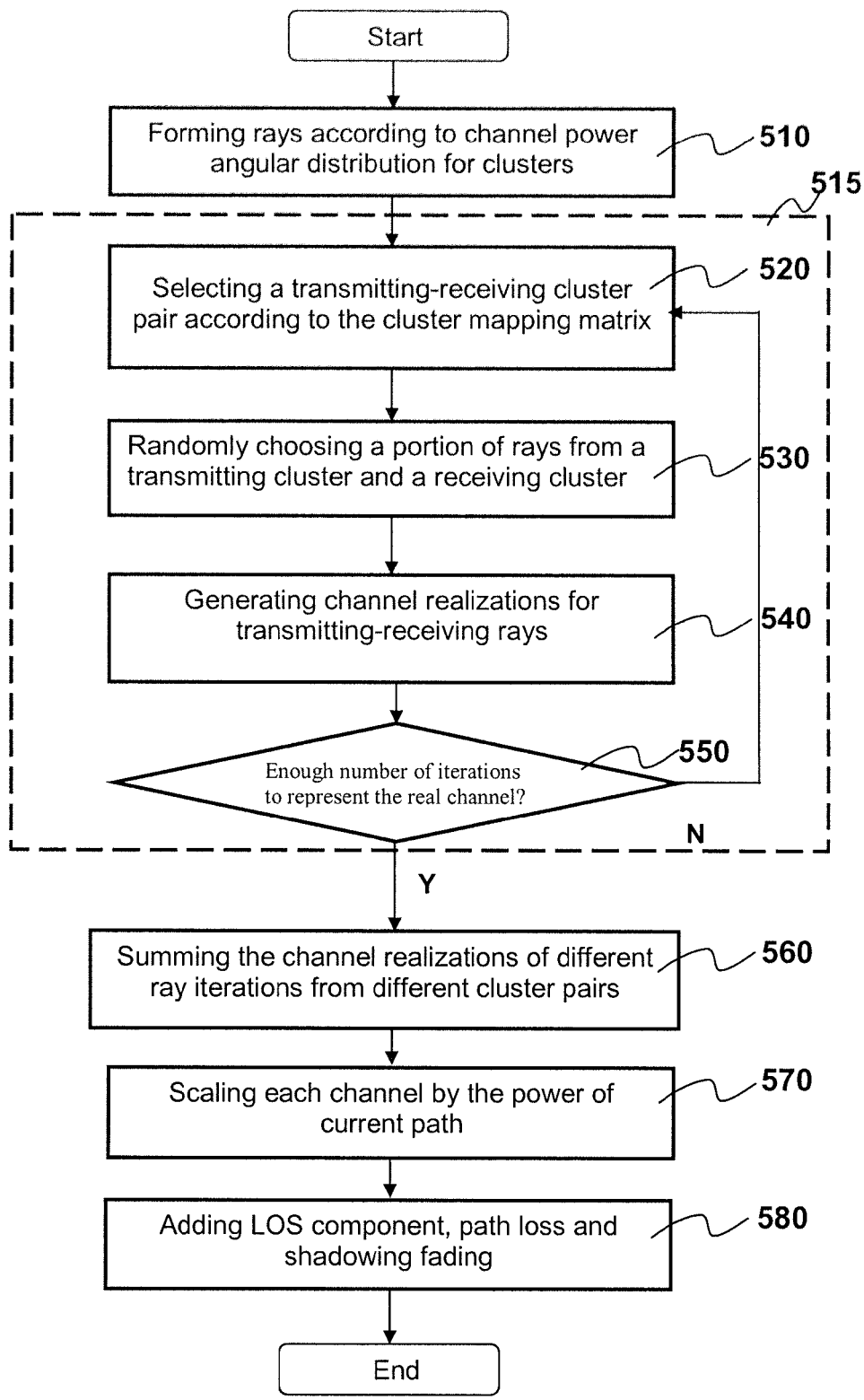
FIG. 5 shows a flowchart of enhanced channel simulation.

FIG. 5 shows a flowchart of enhanced channel simulation. Firstly, rays are generated according to channel power angular distribution for clusters in ray formation step 510. For each single cluster, equal number of rays is generated. Iterations 515 are subsequently performed. In each iteration 515, a transmitting-receiving cluster pair is selected according to the cluster mapping matrix in cluster selection step 520. For the selected cluster pair, a portion of rays is randomly selected from the transmitting cluster and a portion of rays is randomly selected from the receiving cluster in random choosing step 530.

For the portions of randomly selected rays, channel realizations are generated in channel realizations step 540 by applying transmitting ray propagation processing, polarization shifter and receiving ray propagation processing. The transmitting ray propagation processing (not shown) uses the antenna radiation pattern at transmitter, Doppler at transmitter and transmitting antenna array structure to process the transmitting rays. The polarization shifter (not shown) applies the polarization scattering matrix (PSM), which reflects the polarization change by scattering, reflection and diffraction of the environment. The receiving ray propagation processing (not shown) uses the receiving rays, antenna radiation pattern at receiver, Doppler at receiver and receiving antenna array structure, to process the receiving rays. The iteration 515 through steps 520, 530 and 540 will come to an end if there is enough number of iterations to represent the real channel in checking step 550. The iteration 515 comes to an end in the checking step when all clusters at both transmitter and receiver have been selected even for those cluster pairs with low probability as reflected by their low power mapping relationship in the cluster mapping matrix, and the rays generated has distributed over the whole sphere throughout all possible directions. The specific number of iteration needs to be determined for specific cases given the number of transmitting and receiving clusters, the values in the cluster mapping matrix, and the number of rays each time generated.

All the channel realizations of different ray iterations from different cluster pairs are summed together in summing step 560. The resulting channel realization is subsequently scaled by the power of current path in scaling step 570 and added with effects like LOS (line-of-sight) component, path loss and shadowing fading in effect adding step 580.

The embodiment of the claimed invention for MIMO simulation represents the broadest simulation method that covers single-antenna simulations, the claimed channel simulation method can also be applied to non-MIMO cases, such as SISO (single-input single-output), MISO (multiple-input single-output), and SIMO (single-input multiple-output). To perform the simulation under these cases, the transmitting side and/or the receiving side needs to be set to the single antenna specification.

Figure 6:
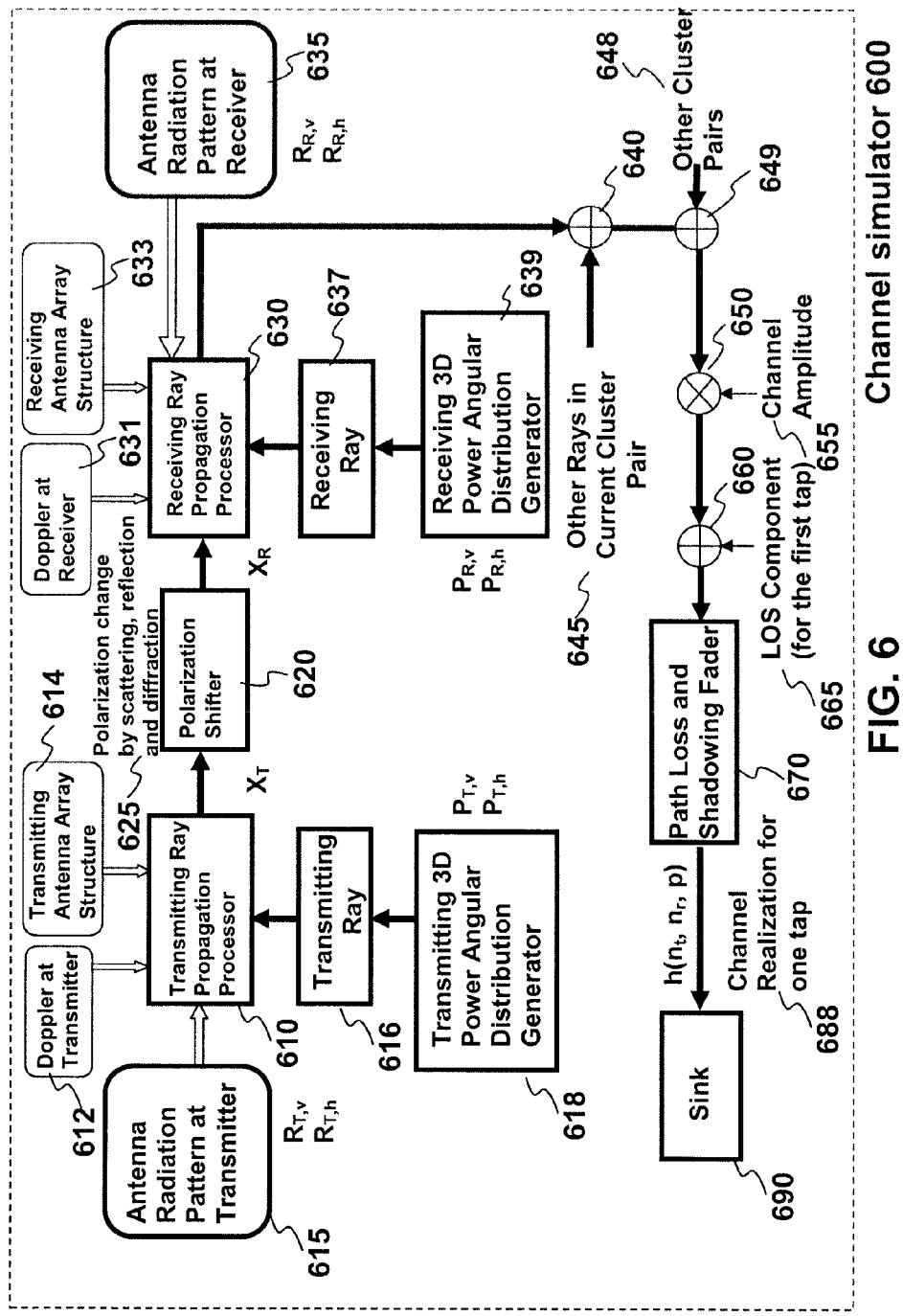
FIG. 6 shows a block diagram of an implementation of the channel simulator.

FIG. 6 shows a block diagram of the implementation of the channel simulator 600. The channel simulator includes a transmitting ray propagation processor 610. The transmitting ray propagation processor needs the following inputs to simulate the transmitting rays $X_T$: antenna radiation pattern at transmitter 615 ($R_{T,v}, R_{T,h}$), Doppler at transmitter 612, transmitting antenna array structure 614 and transmitting ray 616 which is generated by a transmitting 3D power angular distribution generator 618 ($P_{T,v}, P_{T,h}$). The transmitting rays $X_T$ are subsequently processed by a polarization shifter 620. The polarization shifter 620 simulates polarization change by scattering, reflection and diffraction and generates the post-polarization-shifter transmitting rays $X_R$. The post-polarization-shifter transmitting rays $X_R$ are input to a receiving ray propagation processor 630. The receiving ray propagation processor further processes the post-polarization-shifter transmitting rays $X_R$ together with the following inputs: antenna radiation pattern at receiver 635 ($R_{R,v}$, $R_{R,h}$), Doppler at receiver 631, receiving antenna array structure 633 and receiving ray 637 which is generated by a receiving 3D power angular distribution generator 639 ($P_{R,v}$, $P_{R,h}$). The output of the receiving ray propagation processor 630 will subsequently be combined with other ray pairs in current cluster pair 645 by a first adder 640. The first adder output (not shown) is added with the summation of rays from other cluster pairs 648 by a second adder 649. The second adder output (not shown) is multiplied with channel amplitude 655 in a multiplier 650. For the first tap, the multiplier output (not shown) is added with LOS (Line-of-sight) component 665 by a third adder 660. The third adder output (not shown) is processed by a path loss and shadowing fader 670. The fader output (not shown) gives the channel realization for one tap 688 ($h(n_t, n_r, p)$) to a sink 690 to complete the channel simulation.

Figure 7A:
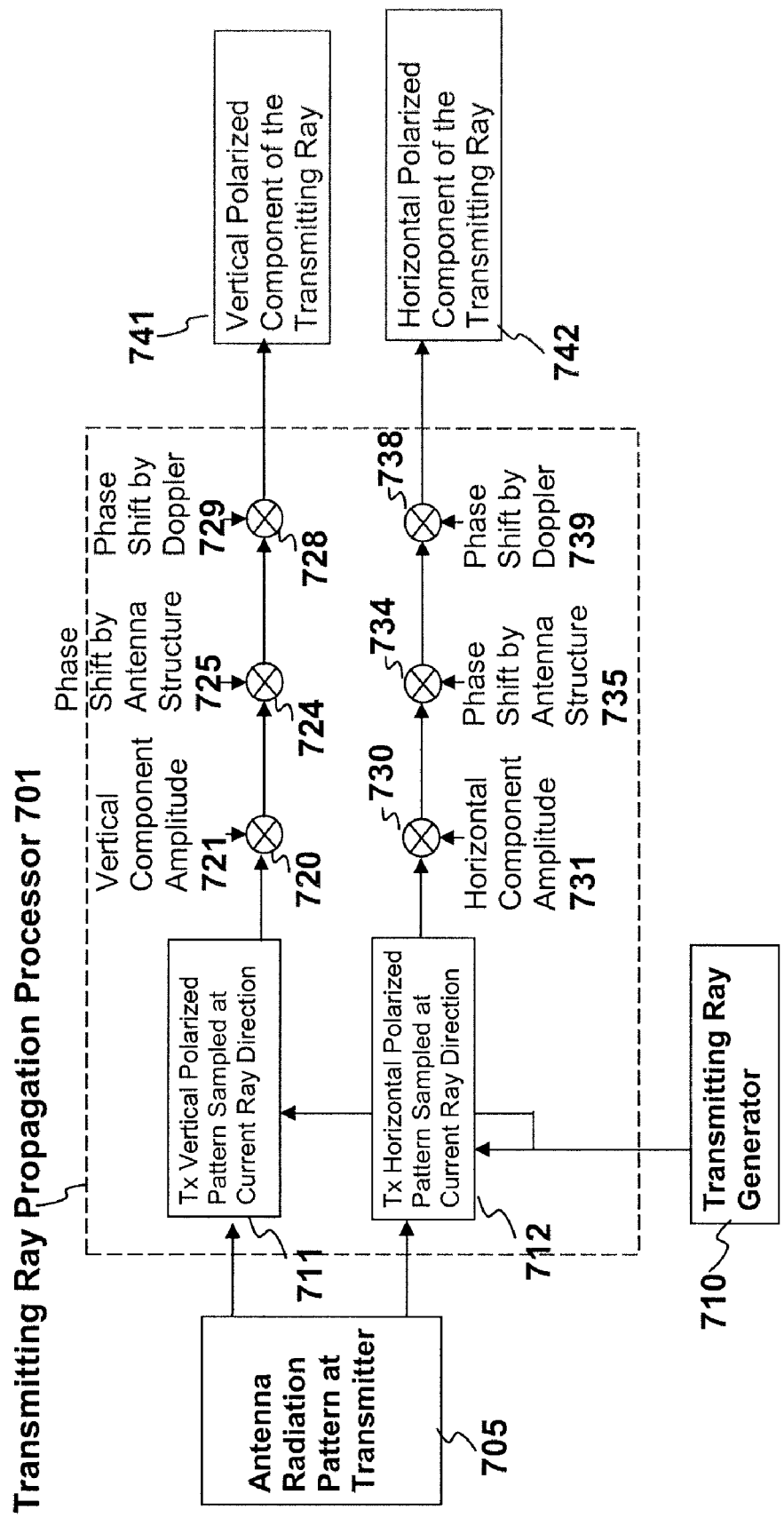
FIG. 7A shows a block diagram of transmitting ray propagation processor of an implementation of channel simulator.

FIG. 7A shows a block diagram of the transmitting ray propagation processor of the channel simulator. From antenna radiation pattern at transmitter 705 and transmitting ray generator 710, the transmitting ray propagation processor 701 acquires the transmitter vertical polarized pattern sampled at current ray direction 711 and the transmitter horizontal polarized pattern sampled at current ray direction 712. The transmitter vertical polarized pattern sampled at current ray direction 711 is multiplied with vertical component amplitude 721 ($\sqrt{P_{v,Tx}}$) by a first multiplier 720. The first multiplier output (not shown) is multiplied with phase shift by antenna structure 725 by a second multiplier 724. The second multiplier output (not shown) is multiplied with phase shift by Doppler 729 by a third multiplier 728. The third multiplier output (not shown) will give vertical polarized component of the transmitting ray 741. The transmitter horizontal polarized pattern sampled at current ray direction 712 is multiplied with horizontal component amplitude 731 ($\sqrt{P_{h,Tx}}$) by a fourth multiplier 730. The fourth multiplier output (not shown) is multiplied with phase shift by antenna structure 735 by a fifth multiplier 734. The fifth multiplier output (not shown) is multiplied with phase shift by Doppler 739 by a sixth multiplier 738. The sixth multiplier output (not shown) will give horizontal polarized component of the transmitting ray 742.

Figure 7B:
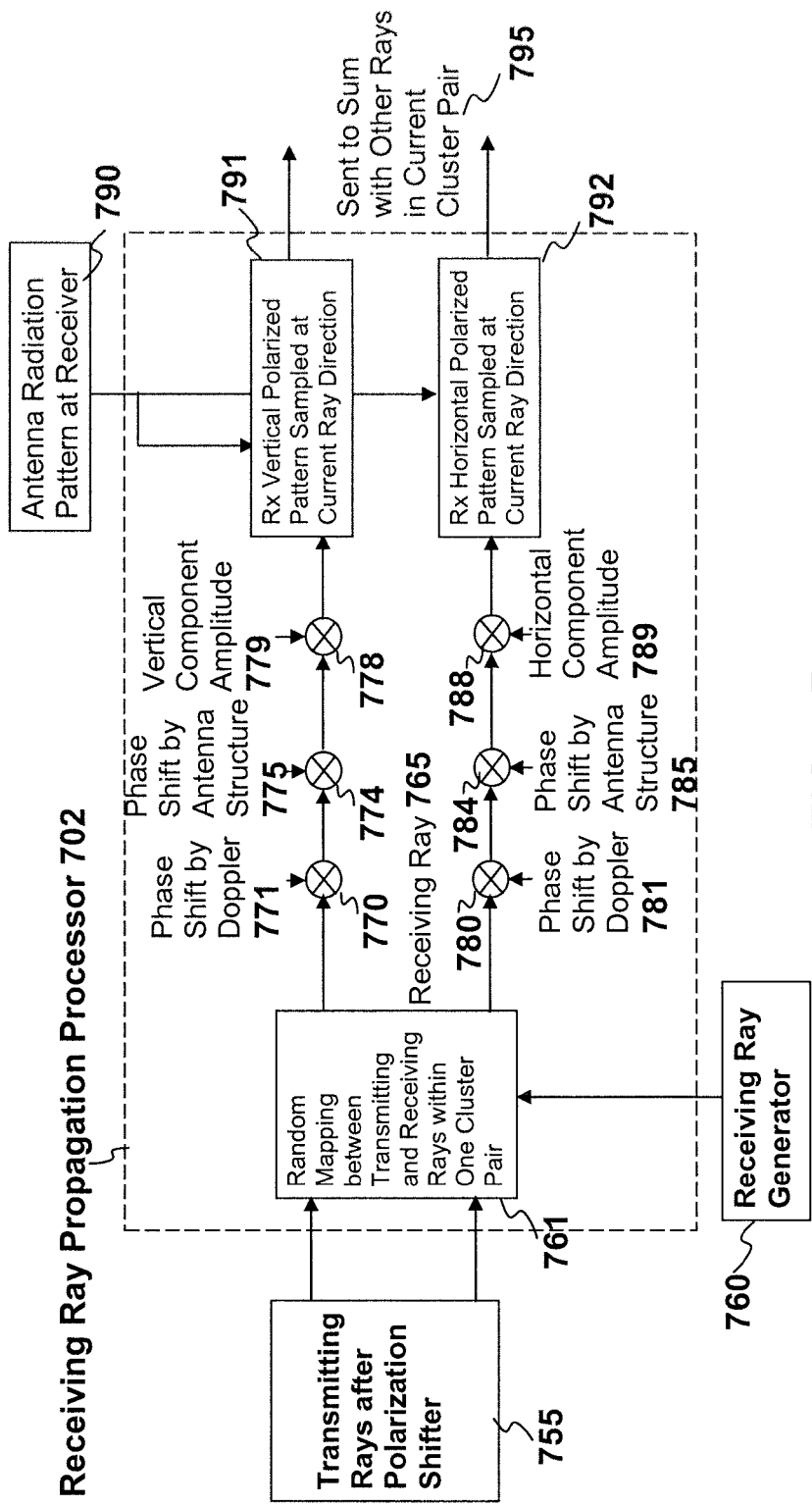
FIG. 7B shows a block diagram of receiving ray propagation processor of an implementation of channel simulator.

FIG. 7B shows a block diagram of the receiving ray propagation processor of the channel simulator. By a random mapping between transmitting and receiving rays within one cluster pair 761, the receiving ray propagation processor 702 maps the transmitting rays after polarization shifter 755 with the receiving rays from the receiving ray generator 760. The mapping output (not shown) is multiplied with phase shift by Doppler 771 by a first multiplier 770. The first multiplier output (not shown) is multiplied with phase shift by antenna structure 775 by a second multiplier 774. The second multiplier output (not shown) is multiplied with a vertical component amplitude 779 ($\sqrt{P_{v,Rx}}$) by a third multiplier 778. The receiver vertical polarized pattern sampled at current ray direction 791 can subsequently be obtained from the third multiplier output (not shown) and the antenna radiation pattern at receiver 790. The mapping output (not shown) is also multiplied with phase shift by Doppler 781 by a fourth multiplier 780. The fourth multiplier output (not shown) is multiplied with phase shift by antenna structure 785 by a fifth multiplier 784. The fifth multiplier output (not shown) is multiplied with a horizontal component amplitude 789 ($\sqrt{P_{h,Rx}}$) by a third multiplier 788. The receiver horizontal polarized pattern sampled at current ray direction 792 can subsequently be obtained from the sixth multiplier output (not shown) and the antenna radiation pattern at receiver 790. Both the receiver vertical polarized pattern sampled at current ray direction 791 and the receiver horizontal polarized pattern sampled at current ray direction 792 will subsequently be sent to sum with other ray pairs in current cluster pair 795.

Figure 8A:
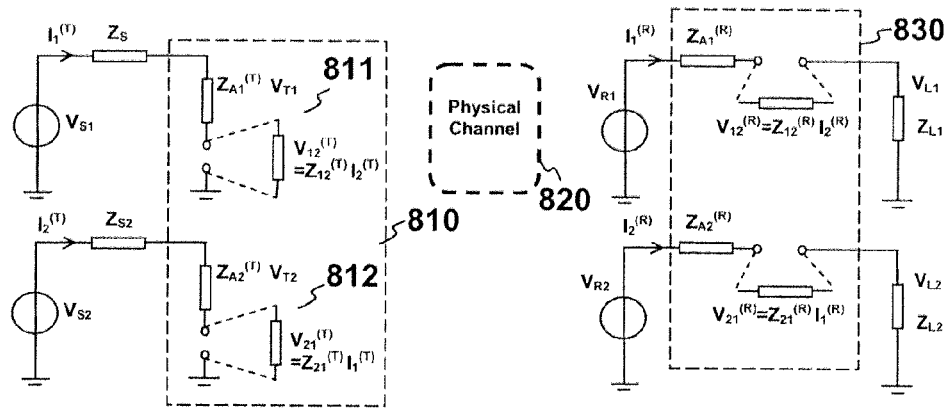
FIG. 8A shows a schematic for modeling channel realization with antenna element isolation effect.
Figure 8B:
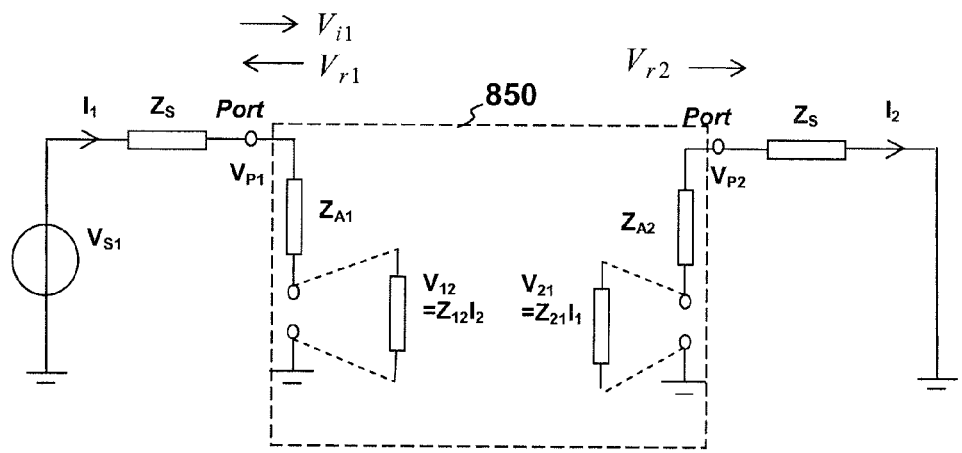
FIG. 8B shows a schematic for using network analyzer to measure the S parameter.

FIG. 8A shows a schematic for modeling channel realization with antenna element isolation effect. FIG. 8B shows a schematic for using network analyzer to measure the S parameter.

For transmitting side 810, the voltages $V_{S1}$ and $V_{S2}$ are signals transmitted to antenna. The voltages $V_{T1}$ and $V_{T2}$ are signals transmitted to the physical channel 820. $V_{R1}$ and $V_{R2}$ are the received signals from the physical channel 820 at receiving side 830. And $V_{L1}$ and $V_{L2}$ are signals finally received by the wireless system.

The channel realization described in previous embodiments is the channel observed from $V_{T1}$, $V_{T2}$ to $V_{R1}$, $V_{R2}$. In the following, a method of adding antenna element isolation effect will be described. The antenna element isolation effect is also referred to mutual coupling effect.

The antenna element isolation effect is modeled as a voltage excited by the other element. For example, the additional voltage introduced by the mutual coupling on the first transmitting antenna element 811, $V_{12}^{(T)}$, is excited by the current on the second transmitting antenna element 812, $I_2^{(T)}$. A mutual coupling impedance $Z_{12}^{(T)}$ is used to describe the current-voltage relationship. Similar conditions are for the receiving side 830. The channel realization with antenna element isolation effect will subsequently be given by the following equation:

$$H_M = Z_L[Z_L + Z^{(R)}]^{-1} \cdot H_R \cdot Z_A^{(T)}[Z_S + Z^{(T)}]^{-1}$$

Where the load impedance $$Z_L = \begin{bmatrix} Z_{L1} & 0 \\ 0 & Z_{L2} \end{bmatrix};$$

the source impedance $$Z_S = \begin{bmatrix} Z_{S1} & 0 \\ 0 & Z_{S2} \end{bmatrix};$$

the antenna impedance $$Z_A^{(T)} = \begin{bmatrix} Z_{A1}^{(T)} & 0 \\ 0 & Z_{A2}^{(T)} \end{bmatrix};$$

the mutual coupling impedance matrices $Z^{(R)}$ and $Z^{(T)}$ are matrices having the mutual coupling impedance included as matrix elements. On the transmitting side 810, $$Z^{(T)} = \begin{bmatrix} Z_{A1}^{(T)} & Z_{12}^{(T)} \\ Z_{21}^{(T)} & Z_{A2}^{(T)} \end{bmatrix},$$

and on the receiving side 830

$$Z^{(R)} = \begin{bmatrix} Z_{A1}^{(R)} & Z_{12}^{(R)} \\ Z_{21}^{(R)} & Z_{A2}^{(R)} \end{bmatrix};$$

channel realization $H_R$ represents the channel generated from the double-directional channel modeling, and $H_M$ is the channel realization with the mutual coupling effect added.

The mutual coupling impedances $Z_{12}^{(T)}$, $Z_{21}^{(T)}$, $Z_{12}^{(R)}$ and $Z_{21}^{(R)}$ can be measured by measuring S parameter using network analyzer 850. In FIG. 8B, the two element antenna is collected to the two ports of network analyzer 850. The following relationship holds for the measurement:

$$S_{21} = \frac{2Z_S Z_{21} Z_{L1}}{(Z_{L1} + Z_S) \cdot (Z_{A1} Z_{A2} + Z_{A1} Z_S + Z_{12} Z_{21})},$$

where $Z_{L1} = Z_{A1} + \frac{Z_{12} Z_{21}}{Z_{A2} + Z_S}$, and $$S_{12} = \frac{2Z_S Z_{12} Z_{L2}}{(Z_{L2} + Z_S) \cdot (Z_{A2} Z_{A1} + Z_{A2} Z_S + Z_{21} Z_{12})},$$

where $Z_{L2} = Z_{A2} + \frac{Z_{21} Z_{12}}{Z_{A1} + Z_S}$

If the antenna elements are symmetric, and $Z_{A1}=Z_{A2}=Z_A$, $Z_{12}=Z_{21}=Z_C$, the relationship will be $$Z_{12} = Z_{21} = Z_C = \frac{Z_S \pm \sqrt{Z_S^2 - S_{21}^2(Z_A + Z_S)^2}}{S_{21}}.$$

Under most circumstances, the symmetric assumption cannot be held true, then the mutual coupling impedances $Z_{12}$ and $Z_{21}$ have to be transformed from S parameter using asymmetric antenna model.

Figure 9:
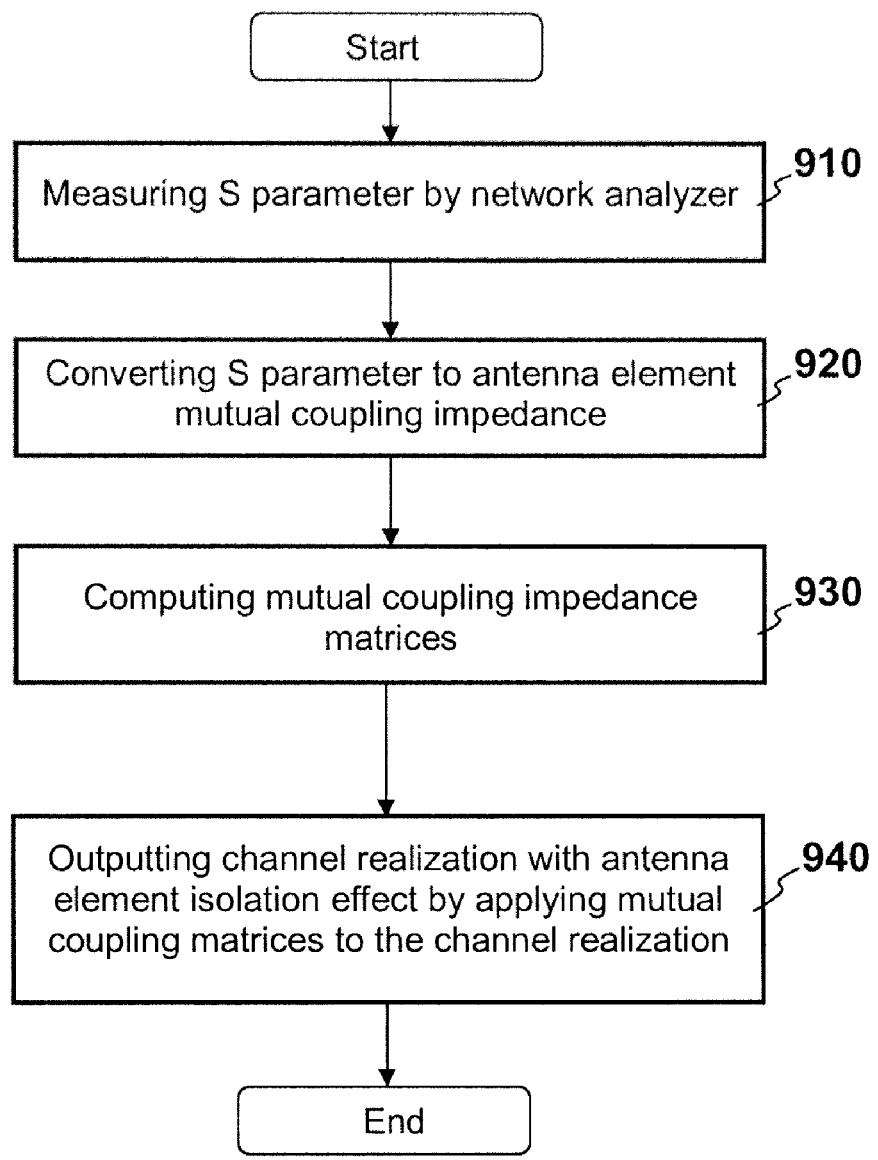
FIG. 9 shows a flowchart of adding antenna element isolation effect to channel realization.

FIG. 9 shows a flowchart of adding antenna element isolation effect to channel realization. Firstly S parameter of an antenna is measured by network analyzer in measuring step 910. Two elements of the antenna are connected to the two ports of the network analyzer to measure the values of $S_{21}$ and $S_{12}$. When measuring the radiation pattern of one antenna element, the other element is open circuit to generate the open circuit radiation pattern so that the radiation pattern can be free of any antenna element isolation effect. Secondly the measured S parameter values are converted to the mutual coupling impedances $Z_{21}$ and $Z_{12}$ in converting step 920. The mutual coupling impedance matrices $Z^{(R)}$ and $Z^{(T)}$ are subsequently computed in mutual coupling computation step 930. The mutual coupling impedance matrices $Z^{(R)}$ and $Z^{(T)}$ are applied on channel realizations $H_R$ generated by enhanced double-direction channel simulation method to add antenna element isolation effect in outputting channel realization with antenna element isolation effect step 940. The output is channel realization with antenna element isolation effect $H_M$.

Figure 10:
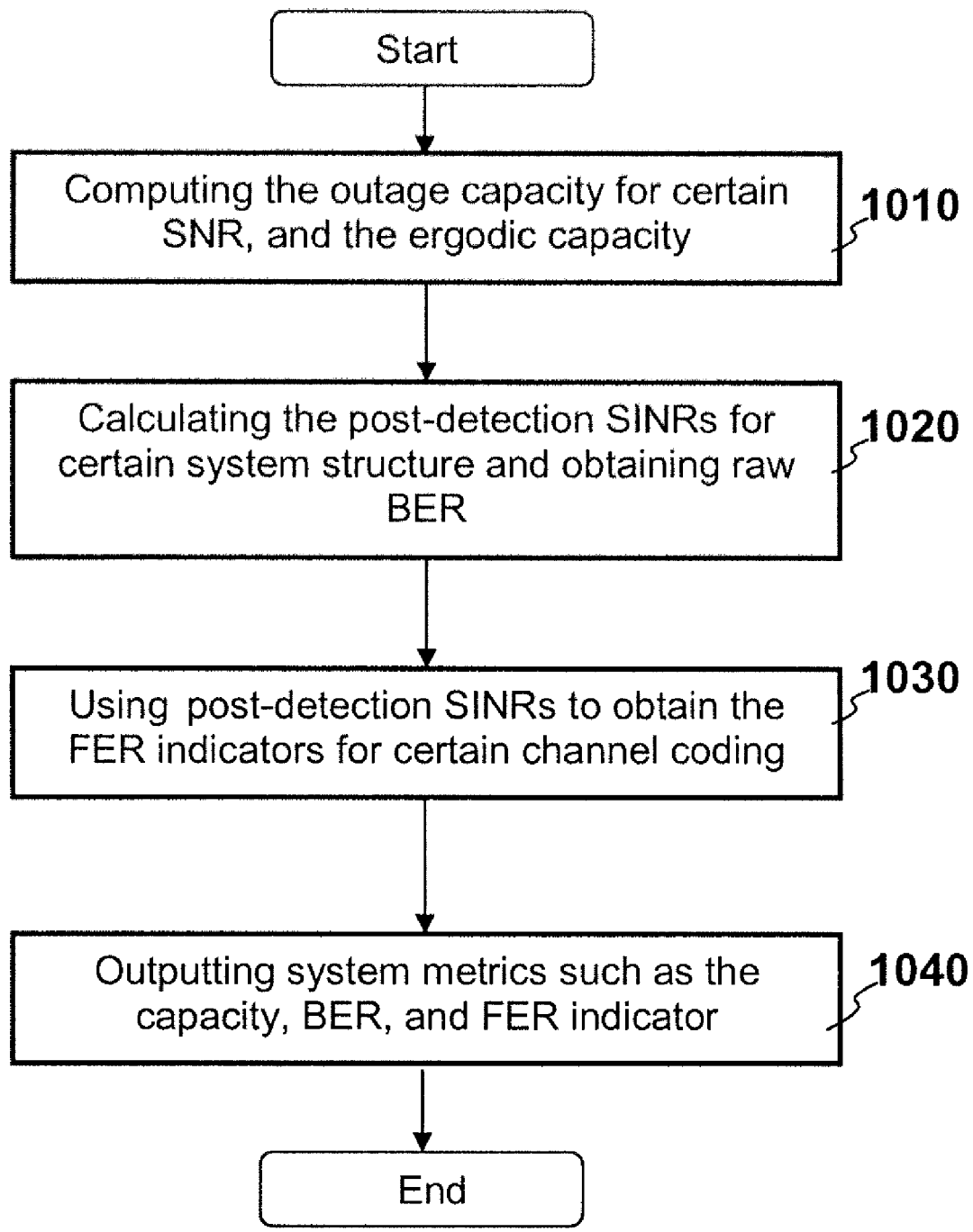
FIG. 10 shows a flowchart of performing baseband abstraction.

FIG. 10 shows a flowchart of performing baseband abstraction. The ergodic capacity is computed using Shannon capacity equation, and the outage capacity is the CDF (Cumulative Density Function) of the capacity for certain SNR (Signal to Noise Ratio) in capacitily computation step 1010.

The post-detection SINRs (Signal to Interference Noise Ratio) are obtained from the channel realization in step 1020. The spatial filtering matrix is firstly computed, and the post-detection SINR can be computed based on the filtered signal power and noise plus interference power. The symbol error is computed using the approximation functions (Q functions) based on the post-detection SINRs. The symbol error rate is subsequently converted to bit error rate.

In step 1030, the FER indicators are computed based the post-detection SINRs. A possible embodiment of computing the FER indicator is $$\text{FER\_Indicator} = -\beta \ln\left(\frac{1}{N}\sum_{n=1}^{N}\exp\left(-\frac{SINR_n}{\beta}\right)\right)$$

where $\beta$ is a parameter related to coding block length and the coding rate. And the range N of the SINRs to be computed depends on the system configuration.

Figure 11:
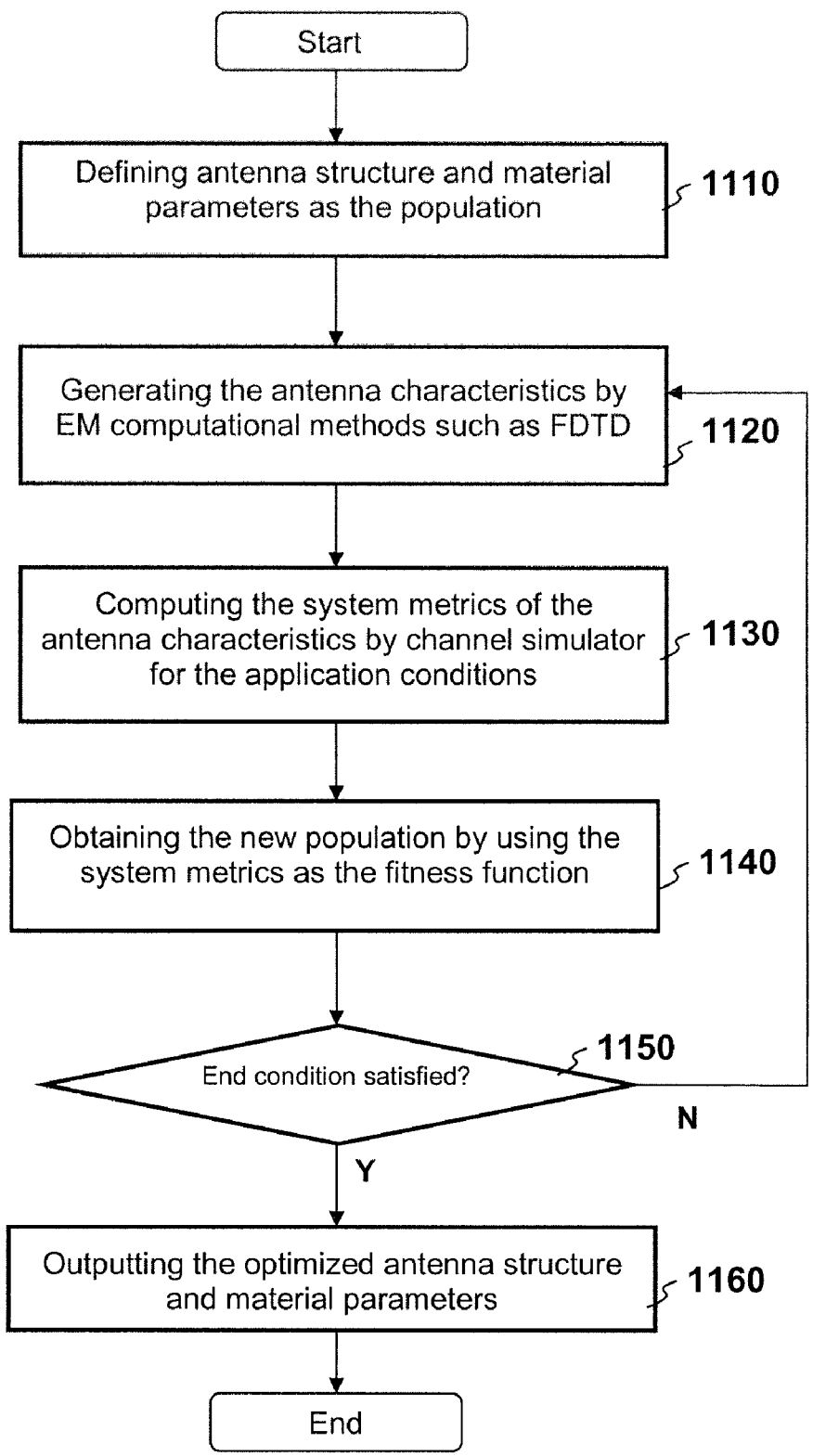
FIG. 11 shows a flowchart of evaluating and optimizing antenna parameters.

FIG. 11 shows a flowchart of a possible embodiment method to optimize the antenna design parameters.

Traditionally antenna designers use the EM simulator to help the design. The electromagnetic computational methods implemented in EM simulators include FDTD (finite-differential time-domain), FEM (finite element method) and various approaches to solve the Maxwell equations under different conditions. The antenna structure and material parameters as geometrical layout information and material permittivity, are input to the EM simulator, and the antenna characteristics are output. The antenna characteristics generated include the antenna radiation pattern, transmission and reflection characteristics of the antenna. The transmission characteristics include S-parameters $S_{21}$ and $S_{12}$, gain, insertion loss and MIMO antenna element isolation. The reflection characteristic includes S-parameters $S_{11}$ and $S_{22}$, reflection coefficient, return loss, and VSWR.

One possible embodiment for antenna optimization method can be a genetic algorithm-based optimization. The genetic algorithm (GA) defines a population which is composed of chromosomes. A chromosome is a sequence of bits which determines the key characteristics of the object under study. A fitness function is defined to evaluate the quality of the chromosome. The GA works in the loop of selection, crossover, mutation and acception. In the selection step, two parent chromosomes are selected according to the fitness function. In the crossover step, new offspring is generated with a crossover probability. In the mutation step, the offspring generated in the crossover step is mutated with a mutation probability. In the acception step, the offspring mutated in the mutation step is accepted in the population, and the chromosome with lowest fitness function is deleted. The loop is terminated when an end condition is satisfied.

The key of GA is the fitness function. In current antenna optimizations, the fitness function is generally chosen as minimization or maximization of certain antenna characteristics. Some examples of fitness function include minimizing return loss, minimizing VSWR, or maximizing antenna gain at certain carrier frequency. The population is the antenna structure and material parameters.

In the claimed method, the fitness function is chosen as the system metrics generated by channel simulation. The GA works with the new fitness function to find the optimized antenna design.

In population defining step 1110, antenna structure and material parameters are defined as the population for GA optimization.

In EM computation step 1120, the antenna characteristics is generated by EM computational methods such as FDTD.

In system metric generating step 1130, the system metrics of the antenna characteristics is generated by channel simulator for the application channel conditions. In one embodiment, the system metrics include ergodic capacity, outage capacity, received signal power, post-detection SINR, raw symbol error rate, raw bit error rate, coded bit error rate, and frame error rate.

In obtaining new population step 1140, the new population is obtained by using the system metrics as the fitness function. The selection, crossover, mutation and accepting steps of GA are applied in this step.

The end condition 1150 refers to the variation of the fitness function is under a threshold. Then finally the optimized antenna design parameters are output in step 1160.

The GA is suitable for the computational infeasible problems and adapt the solutions in response to a changing environment. Thus GA is a suitable method for antenna optimization. GA works by discovering, emphasizing and recombining the good schemas (building blocks) of solutions in a highly parallel fashion. For antenna optimization, the good schemas of the antenna for the channel environment is kept, and those not suitable for the channel environment are weakened or destroyed by GA. The application of channel simulator in the antenna parameter optimization can be described by the above GA assisted process.

The antenna evaluation method can be applied to compact terminal antenna isolation and radiation pattern optimization, and outdoor basestation antenna radiation pattern optimization.

Figure 12:
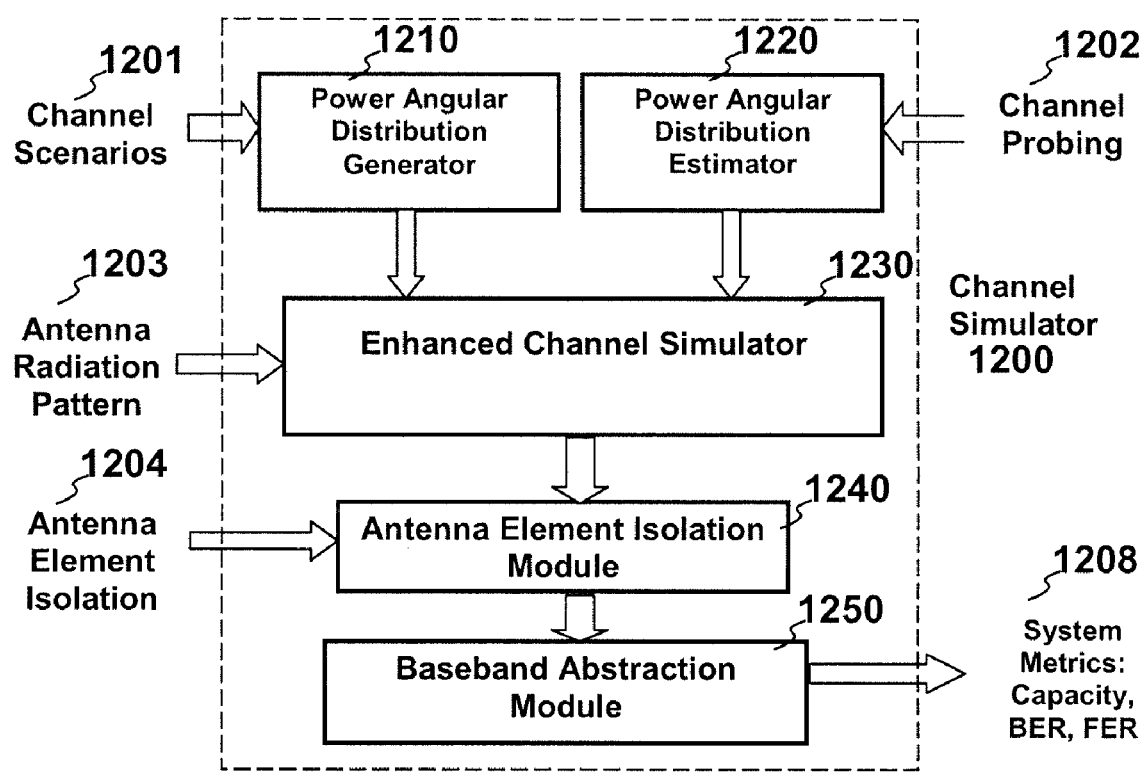
FIG. 12 shows a block diagram of an apparatus for simulating a propagation channel.

FIG. 12 shows a block diagram of an apparatus for simulating a propagation channel, also known as channel simulator 1200. The enhanced channel simulator 1230 performs enhanced channel simulation as described above. The enhanced channel simulator 1230 takes the inputs of antenna radiation pattern 1203 and power angular distributions at both receiving side and transmitting side. The power angular distributions at both receiving side and transmitting side are provided to the enhanced channel simulator 1230 from either power angular distribution generator 1210 or power angular distribution estimator 1220. The power angular distribution generator 1210 obtains power angular distribution by generation as described above with the input of channel scenarios 1201. The power angular distribution estimator 1220 obtains power angular distribution by estimation as described above with the input of results from channel probing 1202. The enhanced channel simulator 1230 outputs channel realizations to antenna element isolation module 1240. The antenna element isolation module 1240 acquires the input of antenna element isolation 1204 and add the antenna element isolation effect to the channel realizations. The antenna element isolation module 1240 subsequently outputs the channel realization results with the antenna element isolation effect to baseband abstraction module 1250. The baseband abstraction module 1250 will process the channel realization results to generate an output of system metrics 1208 such as capacity, BER, and FER indicator.

The description of preferred embodiments of this invention are not exhaustive and any update or modifications to them are obvious to those skilled in the art, and therefore reference is made to the appending claims for determining the scope of this invention.

INDUSTRIAL APPLICABILITY

The disclosed methods and related system have industrial applicability in evaluation and design of antenna software/hardware, in particular those with MIMO antennas, including MIMO antenna isolation optimization for compact terminal antennas as well as antenna pattern optimization for indoor/outdoor applications.

We claim:

1. A method of simulating a propagation channel, comprising:

obtaining a channel power angular distribution such that one or more receiving clusters are identified at a receiving side of the propagation channel and one or more transmitting clusters are identified at a transmitting side of the propagation channel to map the power relationship between the receiving clusters and the transmitting clusters;

generating a time-varying channel realization sequence which represents how the response of the propagation channel varies with time by using the relationship between the receiving clusters and the transmitting clusters and one or more actual antenna radiation patterns as measured from one or more antennae;

adding an antenna element isolation effect to said time-varying channel realization sequence such that the response of the propagation channel includes mutual coupling impedance; and applying baseband abstraction to the time varying channel realization sequence to generate one or more effects of the propagation channel including, but not limited to, one or more of, scattering, diffraction, and line-of-sight propagation so that one or more system metrics are generated based on the time varying channel realization sequence.

2. The method of simulating a propagation channel according to claim 1, wherein said obtaining channel power angular distribution additionally comprises:

selecting a channel scenario such that one or more channel parameters are defined according to a channel model;

loading corresponding azimuth parameters to generate azimuth power angular distribution;

providing corresponding elevation parameters to generate elevation power angular distribution; and computing said channel power angular distribution.

3. The method of simulating a propagation channel according to claim 1, wherein said obtaining channel power angular distribution additionally comprises:

conducting channel probing; and performing estimation algorithm to obtain said channel power angular distribution.

4. The method of simulating a propagation channel according to claim 1, wherein said generating time-varying channel realization sequence additionally comprises:

forming one or more rays for one or more clusters according to channel power angular distribution;

selecting a transmitting-receiving cluster pair according to a cluster mapping matrix; and computing channel realizations of multiple channel taps and multiple antenna pairs for a series of time instances.

5. The method of simulating a propagation channel according to claim 1, wherein the time-varying realization sequence is generated to determine one or more system metrics which are selected from a group of system metrics consisting of capacity, Bit Error Rate and Frame Error Rate indicator.

6. A method of evaluating and optimizing antenna design, comprising:
- defining one or more antenna structure and material parameters as a population of genetic algorithm;
- generating one or more antenna characteristics by one or more electromagnetic computational methods;
- computing one or more system metrics by a channel simulator through which one or more receiving clusters are identified at a receiving side of the propagation channel and one or more transmitting clusters are identified at a transmitting side of the propagation channel to map the power relationship between the receiving clusters and the transmitting clusters;
- choosing a fitness function as the one or more system metrics to generate a new population; and
- obtaining one or more optimized antenna structure and material parameters.

7. The method of evaluating and optimizing antenna design as claimed in claim 6, wherein said antenna characteristics are selected from a group of antenna characteristics consisting of antenna radiation pattern, transmission characteristics, and reflection characteristics.

8. The method of evaluating and optimizing antenna design as claimed in claim 7, wherein said transmission characteristics are selected from a group of transmission characteristics consisting of antenna gain, insertion loss, and MIMO antenna element isolation.

9. The method of evaluating and optimizing antenna design as claimed in claim 7, wherein said reflection characteristics are selected from a group of reflection characteristics consisting of reflection coefficient, return loss, and Voltage Standing Wave Ratio.

10. The method of evaluating and optimizing antenna design as claimed in claim 6, wherein said system metrics are selected from a group of system metrics consisting of ergodic capacity, outage capacity, signal-to-interference-noise ratio (SINR), post-detection SINR, raw symbol error rate, raw bit error rate, coded bit error rate, and frame error rate.

11. The method of evaluating and optimizing antenna design as claimed in claim 6, wherein the antenna is a MIMO antenna.

* * * * *